(12) United States Patent
Kim

(10) Patent No.: US 12,449,814 B2
(45) Date of Patent: Oct. 21, 2025

(54) ROBOT AND CONTROL METHOD THEREFOR

(71) Applicant: Samsung Electronics Co., Ltd., Suwon-si (KR)

(72) Inventor: Minju Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 395 days.

(21) Appl. No.: 18/191,467

(22) Filed: Mar. 28, 2023

(65) Prior Publication Data

US 2023/0229171 A1 Jul. 20, 2023

Related U.S. Application Data

(63) Continuation of application No. PCT/KR2021/000222, filed on Jan. 8, 2021.

(30) Foreign Application Priority Data

Nov. 16, 2020 (KR) .......................... 10-2020-0153000

(51) Int. Cl.
*G06K 9/00* (2022.01)
*G05D 1/00* (2006.01)

(52) U.S. Cl.
CPC .................. *G05D 1/0248* (2013.01)

(58) Field of Classification Search
CPC ..... G06T 5/20; G06T 7/11; G06T 7/50; G06T 2207/10028; G06T 2207/20024; G06T 7/55

See application file for complete search history.

(56) References Cited

U.S. PATENT DOCUMENTS 10,628,968 B1 * 4/2020 Ta-Huynh ............ G06V 10/145
10,699,438 B2 * 6/2020 Lehmann ................. G06T 7/20
(Continued)

FOREIGN PATENT DOCUMENTS

EP 3945349 A1 * 2/2022 ............. G06T 7/586
JP 2020-087407 A 6/2020
(Continued)

OTHER PUBLICATIONS

Change Detection On Points Cloud Data Acquired With a Ground Laser Scanner, D. Girardeau-Montaut et al., ISPRS, 2005. pp. 1-6 (Year: 2005).*

(Continued)

*Primary Examiner* — Jayesh A Patel
(74) *Attorney, Agent, or Firm* — Jefferson IP Law, LLP

(57) ABSTRACT

A robot is provided. The robot includes a depth camera, a light detection and ranging (LIDAR) sensor, and at least one processor, wherein the at least one processor acquires a first depth image including first depth information by using the depth camera, acquires second depth information corresponding to a first area of the first depth image by using the LIDAR sensor, acquires a depth difference between the second depth information and the first depth information included in the first area, identifies an area to be corrected around the first area, acquires information regarding a filter for correcting the first depth information on the basis of the depth difference, and acquires a second depth image by correcting the first depth information corresponding to the area to be corrected, on the basis of the first depth information, the second depth information, and the information regarding the filter.

16 Claims, 11 Drawing Sheets

(56) References Cited

U.S. PATENT DOCUMENTS

| | | | |
|---|---|---|---|
| 10,958,897 B2 * | 3/2021 | Cheng | G06T 7/593 |
| 10,962,647 B2 | 3/2021 | Shin et al. | |
| 11,227,434 B2 | 1/2022 | Chen et al. | |
| 11,507,789 B2 * | 11/2022 | Park | G06V 10/803 |
| 2015/0022693 A1 * | 1/2015 | Appia | G06T 7/521 |
| | | | 348/239 |
| 2015/0077560 A1 * | 3/2015 | Zhang | G06V 20/58 |
| | | | 348/148 |
| 2016/0086052 A1 * | 3/2016 | Piekniewski | G06T 7/292 |
| | | | 382/103 |
| 2017/0109940 A1 * | 4/2017 | Guo | G06T 7/30 |
| 2017/0148168 A1 * | 5/2017 | Lindner | G06T 7/593 |
| 2018/0149753 A1 * | 5/2018 | Shin | G01S 7/4817 |
| 2018/0232859 A1 * | 8/2018 | Siddiqui | G06T 7/90 |
| 2018/0239355 A1 * | 8/2018 | Lee | G08G 1/166 |
| 2019/0012806 A1 * | 1/2019 | Lehmann | G06T 7/246 |
| 2019/0086539 A1 * | 3/2019 | Shin | G01S 7/4813 |
| 2019/0087969 A1 * | 3/2019 | Shpunt | H04N 23/20 |
| 2019/0155302 A1 * | 5/2019 | Lukierski | G05D 1/0044 |
| 2019/0164310 A1 | 5/2019 | Noble et al. | |
| 2019/0168120 A1 * | 6/2019 | Cossairt | G06T 15/08 |
| 2019/0180586 A1 * | 6/2019 | Script | G06T 7/50 |
| 2019/0220650 A1 * | 7/2019 | Lindner | H04N 13/261 |
| 2019/0340775 A1 * | 11/2019 | Lee | G01S 17/931 |
| 2019/0353758 A1 | 11/2019 | Shin et al. | |
| 2020/0122344 A1 * | 4/2020 | Lee | B25J 9/1697 |
| 2020/0167993 A1 * | 5/2020 | Chen | G06V 20/10 |
| 2020/0174129 A1 * | 6/2020 | Abdelkader | G08G 5/21 |
| 2021/0181347 A1 | 6/2021 | Shin et al. | |
| 2021/0406618 A1 * | 12/2021 | Park | G06T 7/70 |
| 2022/0058820 A1 * | 2/2022 | Rahnama | G06T 7/593 |
| 2022/0291387 A1 * | 9/2022 | Pacala | G01S 7/4817 |

FOREIGN PATENT DOCUMENTS

| | | | | |
|---|---|---|---|---|
| JP | 20200087407 A | * | 6/2020 | |
| KR | 20150142542 A | * | 12/2015 | B60W 30/0956 |
| KR | 101788032 B1 | * | 10/2017 | G01B 11/22 |
| KR | 10-1899549 B1 | | 9/2018 | |
| KR | 10-2018-0136294 A | | 12/2018 | |
| KR | 20180136294 A | * | 12/2018 | H04N 13/246 |
| KR | 10-2019-0012443 A | | 2/2019 | |
| KR | 10-1976290 B1 | | 5/2019 | |
| KR | 102010696 B1 | * | 8/2019 | G01S 13/865 |
| KR | 1020180096058 | * | 8/2019 | |
| KR | 10-2019-0107283 A | | 9/2019 | |
| KR | 10-2029850 B1 | | 10/2019 | |
| KR | 10-2019-0131402 A | | 11/2019 | |
| KR | 102090487 B1 | * | 3/2020 | G01S 17/86 |
| KR | 10-2020-0036821 A | | 4/2020 | |
| KR | 10-2104031 B1 | | 4/2020 | |
| KR | 20200036821 A | * | 4/2020 | H04N 13/254 |
| KR | 10-2021-0015516 A | | 2/2021 | |
| KR | 10-2021-0096517 A | | 8/2021 | |
| WO | WO-2017087088 A1 | * | 5/2017 | H04N 23/6812 |
| WO | WO-2019075473 A1 | * | 4/2019 | H04N 23/65 |
| WO | WO-2019117393 A1 | * | 6/2019 | G01S 13/86 |

OTHER PUBLICATIONS

International Search Report dated Jul. 26, 2021, issued in International Patent Application No. PCT/KR2021/000222.

* cited by examiner

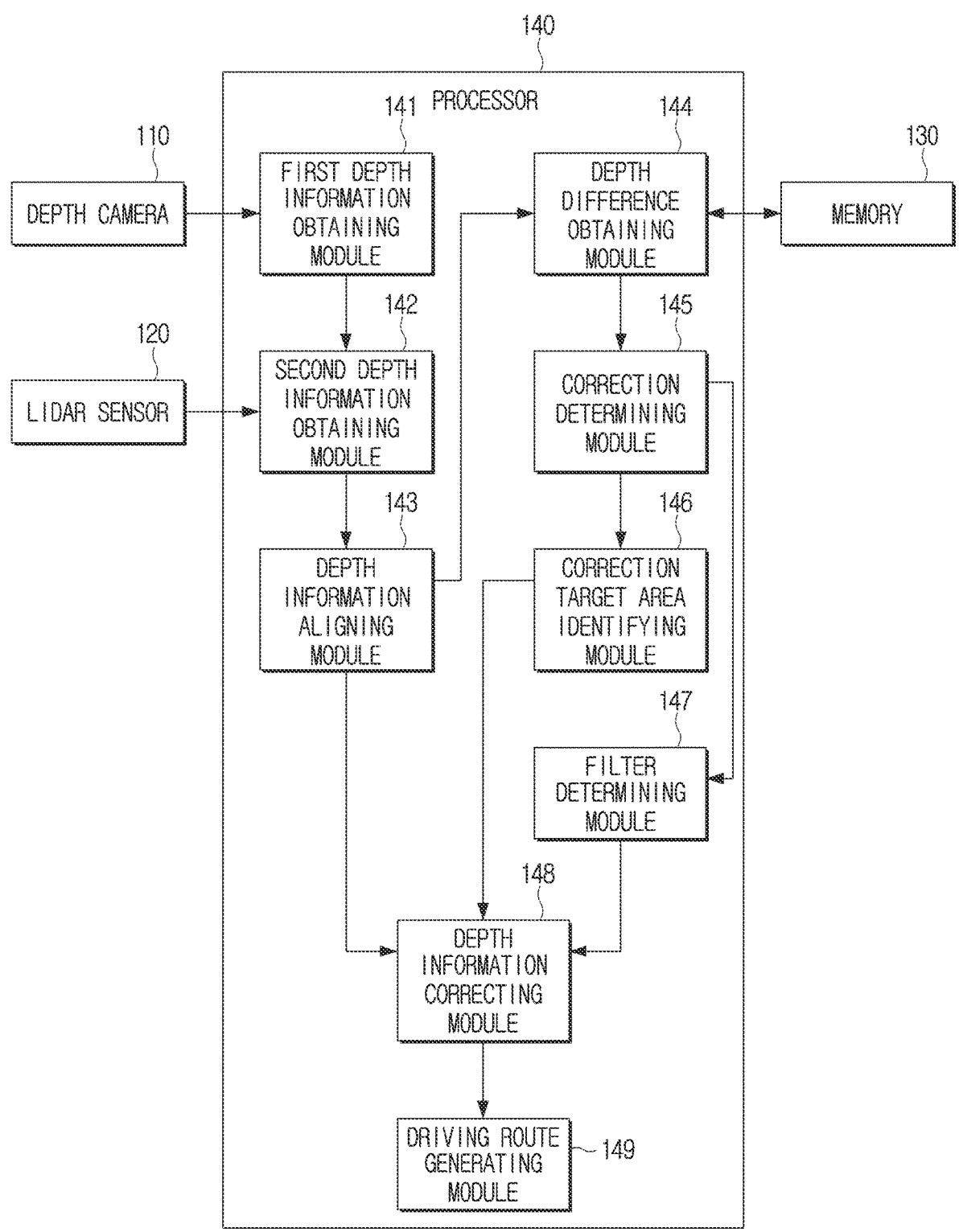

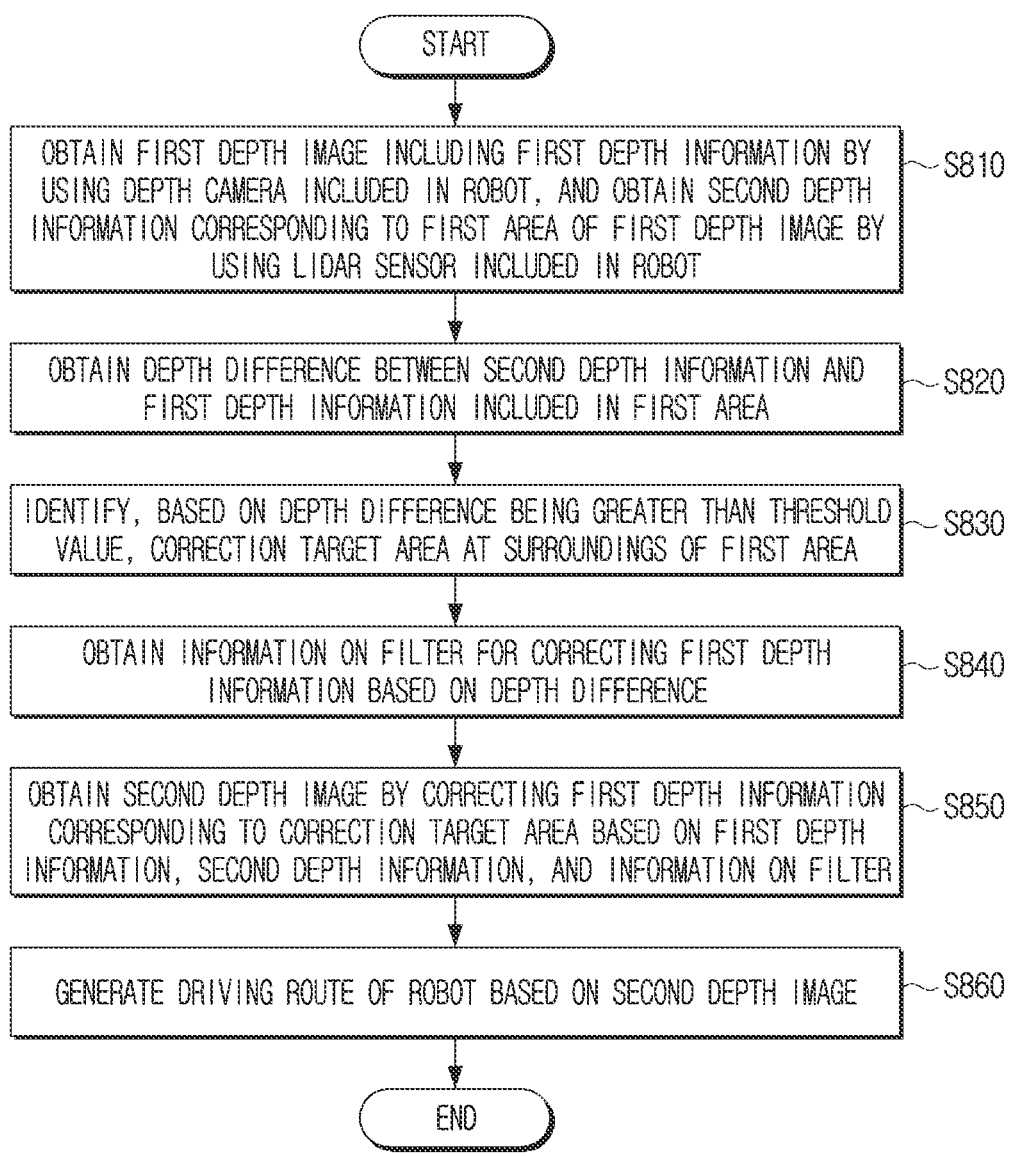

ROBOT AND CONTROL METHOD THEREFOR

CROSS-REFERENCE TO RELATED APPLICATION(S)

This application is a continuation application, claiming priority under § 365(c), of an International application No. PCT/KR2021/000222, filed on Jan. 8, 2021, which is based on and claims the benefit of a Korean patent application number 10-2020-0153000, filed on Nov. 16, 2020, in the Korean Intellectual Property Office, the disclosure of which is incorporated by reference herein in its entirety.

BACKGROUND

1. Field

The disclosure relates to a robot and a control method therefor. More particularly, the disclosure relates to a robot that corrects depth information and operates based on the corrected depth information and a control method therefor.

2. Description of Related Art

For a safe autonomous driving of a robot, obtaining depth information surrounding the robot is important. For this reason, it is typical for an autonomous driving robot to be mounted with not only a red, green and blue (RGB) camera, but also sensors for obtaining depth information such as a depth camera or a Light Detection And Ranging (LiDAR) sensor.

Generally, a depth camera may obtain depth information on a relatively broad range, but there is a problem of a level of accuracy in depth information greatly reducing when an object is positioned adjacently with another object. On the other hand, a 2-dimensional (2D) LiDAR sensor may have a high level of accuracy compared to the depth camera, but there is a limit in that depth information may be obtained for only a relatively narrow range. In addition, because a 3-dimensional (3D) LiDAR sensor is high-priced, if a high-end 3D LiDAR sensor which can scan a broad range is mounted to the robot, there is a problem of manufacturing cost of the robot greatly increasing.

Accordingly, there is a growing need for technology to raise the level of accuracy in depth information that is obtained through the depth camera using depth information obtained through the 2D LiDAR sensor.

The above information is presented as background information only to assist with an understanding of the disclosure. No determination has been made, and no assertion is made, as to whether any of the above might be applicable as prior art with regard to the disclosure.

SUMMARY

A technical problem to be solved in the disclosure is in increasing a level of accuracy in depth information that is obtained through a depth camera using depth information obtained through a 2D LiDAR sensor.

Aspects of the disclosure are to address at least the above-mentioned problems and/or disadvantages and to provide at least the advantages described below. Accordingly, an aspect of the disclosure is to provide a robot that corrects depth information and operates based on corrected depth information and a control method therefor.

Additional aspects will be set forth in part in the description which follows and, in part, will be apparent from the description, or may be learned by practice of the presented embodiments.

In accordance with an aspect of the disclosure, a robot is provided. The robot includes a depth camera, a LiDAR sensor, a memory configured to store at least one instruction, and at least one processor, and the at least one processor is configured to obtain a first depth image that includes first depth information by using the depth camera, and obtain second depth information corresponding to a first area of the first depth image by using the LiDAR sensor, obtain a depth difference between the second depth information and the first depth information included in the first area, identify, based on the depth difference being greater than a threshold value, a correction target area in a surrounding area of the first area, obtain information on a filter for correcting the first depth information based on the depth difference, and obtain a second depth image by correcting the first depth information that corresponds to the correction target area based on the first depth information, the second depth information, and the information on the filter.

The at least one processor may be further configured to identify, based on the depth difference being a first value, a first range from the first area as the correction target area, and identify, based on the depth difference being a second value that is greater than the first value, a second range that is greater than the first range from the first area as the correction target area.

The filter may be a matrix that includes a plurality of weight values, and the information on the filter may include at least one from among a size of the filter and a standard deviation of the filter.

The at least one processor may be further configured to obtain, based on the depth difference being smaller than a pre-set value, the filter of a first size, and obtain, based on the depth difference being greater than the pre-set value, the filter of a second size that is greater than the first size.

The at least one processor may be further configured to perform correction of the first depth information that corresponds to the correction target area by applying weight values included in the filter to the second depth information and the first depth information corresponding to a surrounding area of the correction target area.

The at least one processor may be further configured to perform mapping of the first depth information and the second depth information as a reference coordinate system based on an installation position of the depth camera and the LiDAR sensor, and obtain an average value of a difference between the second depth information and the first depth information corresponding to the first area on the reference coordinate system as the depth difference.

The at least one processor may be further configured to obtain a difference between the first depth information and the second depth information corresponding respectively to a plurality of distance sections determined according to a distance from the robot, obtain, based on the depth difference for the respective distance sections, the information on the filter that corresponds to the respective distance sections, and perform correction of the first depth information corresponding to the correction target area based on information on the filter for the respective distance sections.

The filter may correspond to a Gaussian kernel function.

In accordance with another aspect of the disclosure, a control method of a robot is provided. The control method includes obtaining a first depth image that includes first depth information by using a depth camera included in the robot, and obtaining second depth information corresponding to a first area of the first depth image by using a LiDAR sensor included in the robot, obtaining a depth difference between the second depth information and the first depth information included in the first area, identifying, based on the depth difference being greater than a threshold value, a correction target area in a surrounding area of the first area, obtaining information on a filter for correcting the first depth information based on the depth difference, obtaining a second depth image by correcting the first depth information that corresponds to the correction target area based on the first depth information, the second depth information, and the information on the filter, and generating a driving route of the robot based on the second depth image.

According to various embodiments of the disclosure as described above, a robot may perform a task based on depth information with improved level of accuracy. Accordingly, user convenience and satisfaction may be improved as task efficiency is improved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 is a block diagram illustrating a configuration of a robot according to an embodiment of the disclosure;

FIG. 8 is a block diagram illustrating a control method of a robot according to an embodiment of the disclosure.

Throughout the drawings, it should be noted that like reference numbers are used to depict the same or similar elements, features, and structures.

DETAILED DESCRIPTION

Figure 1A:
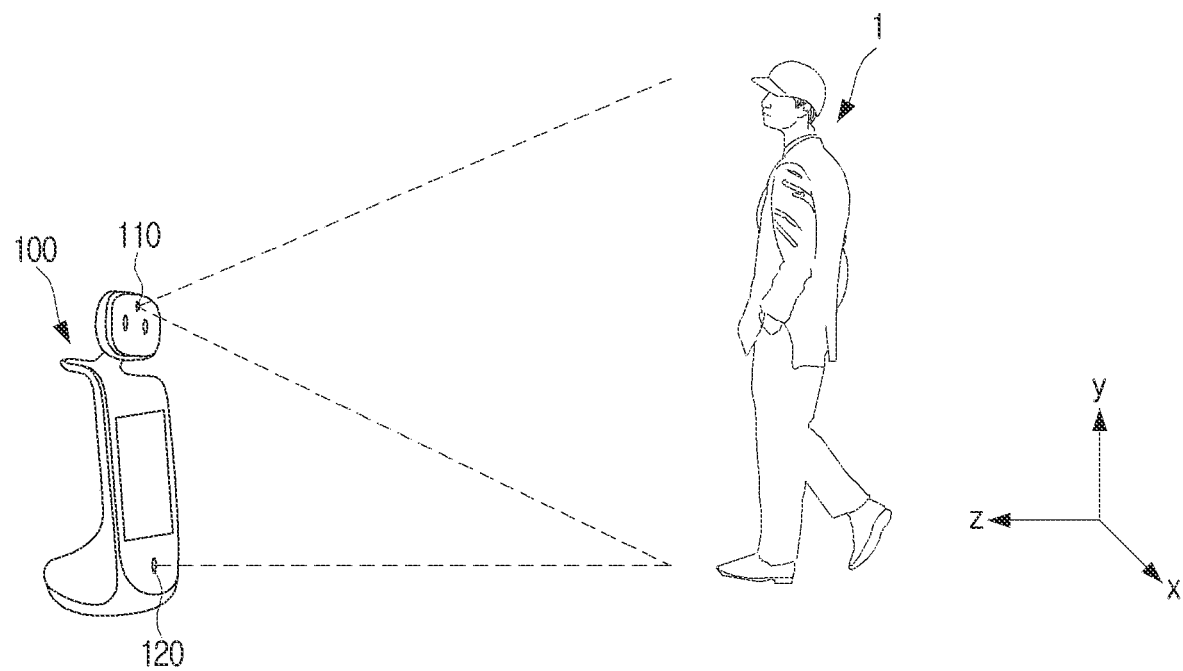
FIG. 1A is a diagram illustrating a robot according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in describing the various embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected. The meaning of the term will be described in detail in the description part of the corresponding disclosure. Accordingly, the terms used herein are not to be understood simply as its designation but based on the meaning of the term and the overall context of the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. In case it is determined that in describing the embodiments, the detailed description of related known technologies may unnecessarily confuse the gist of the disclosure, the detailed description will be omitted.

Terms such as "first," and "second" may be used in describing the various elements, but the elements are not to be limited by the terms. The terms may be used only to distinguish one element from another.

It is to be understood that the terms such as "configure" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

Embodiments of the disclosure will be described in detail with reference to the accompanying drawings to aid in the understanding of those of ordinary skill in the art. However, the disclosure may be realized in various different forms and it should be noted that the disclosure is not limited to the various embodiments described herein. Further, in the drawings, parts not relevant to the description may be omitted, and like reference numerals may be used to indicate like elements throughout the disclosure.

FIG. 1A is a diagram illustrating a robot according to an embodiment of the disclosure.

A robot 100 may include a depth camera 110 and a LiDAR sensor 120. A robot 100 may obtain distance information on a surrounding object 1 using a depth camera 110 and a LiDAR sensor 120. In an embodiment, the robot 100 may obtain a first depth image including first depth information by using the depth camera 110. In another embodiment, the robot 100 may obtain second depth information by using the LiDAR sensor 120. The first depth information may refer to depth information that is obtained through the depth camera 110, and the second depth information may refer to depth information that is obtained through the LiDAR sensor 120.

The depth camera 110 and the LiDAR sensor 120 may have different measuring ranges. In an example, if the LiDAR sensor 120 is a 2D LiDAR sensor, the depth camera 110 may obtain depth information on a range broader than the LiDAR sensor 120 as shown in FIG. 1A. In an embodiment, a level of accuracy in depth information obtained from the depth camera 110 and the LiDAR sensor 120 respectively may be different from each other. In another example, the level of accuracy of the second depth information that is obtained through the LiDAR sensor 120 may be greater than the level of accuracy of the first depth information that is obtained through the depth camera 110.

Accordingly, the robot 100 may perform an operation of correcting the first depth information by using the second depth information with the relatively high level in accuracy.

Figure 1B:
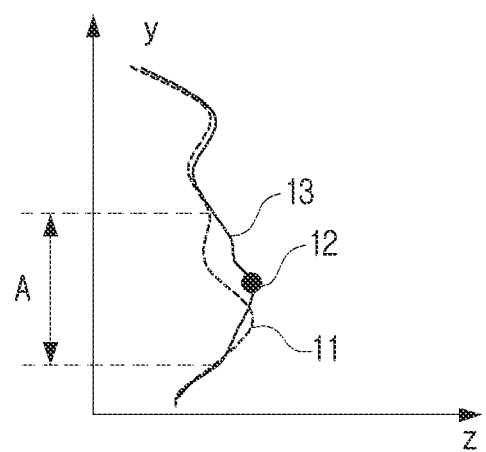
FIG. 1B is a graph illustrating a sensing value of a depth camera and a LiDAR sensor according to an embodiment of the disclosure.

FIG. 1B is a graph illustrating a sensing value of a depth camera and a LiDAR sensor according to an embodiment of the disclosure.

A robot 100 may obtain third depth information 13 by correcting first depth information 11 obtained through a depth camera 110 based on second depth information 12 obtained through a LiDAR sensor 120.

For example, the robot 100 may change the depth information corresponding to the second depth information 12 to the second depth information 12 from among the first depth information 11. The depth information corresponding to the second depth information 12 may refer to the first depth information 11 on a position (x, y) that corresponds with the second depth information 12. In an embodiment, an area that includes the first depth information 11 corresponding to the second depth information 12 from a depth image that is obtained through the depth camera 110 may be referred to as a first area below. The robot 100 may change the first depth information 11 included in the first area to the second depth information 12.

In another embodiment, the robot 100 may correct the first depth information 11 included in a correction target area A which is a surrounding area of the first area from the first depth image based on the second depth information 12. The robot 100 may apply a pre-defined filter to the first depth information 11 included in the correction target area A. The pre-defined filter may refer to a matrix or vector which includes a plurality of weight values. In an example, the pre-defined filter may have a weight value based on a Gaussian kernel function.

As described above, the robot 100 may obtain the third depth information 13 by correcting the first depth information 11 based on the second depth information 12. In yet another embodiment, the robot 100 may obtain depth information that has a high level of accuracy compared to the first depth information 11, and has a broad range compared to the second depth information 12. A depth information correcting operation of the robot 100 will be described in greater detail below.

FIG. 2 is a block diagram illustrating a configuration of a robot according to an embodiment of the disclosure.

A robot 100 may include a depth camera 110, a LiDAR sensor 120, a memory 130, and a processor 140. The depth camera 110 may be a configuration for obtaining a depth image, and may be implemented with at least one from among a stereo method, a Time of Flight (ToF) method, and a structured light method.

The LiDAR sensor 120 may be a configuration for obtaining depth information, and may include a light emitter that outputs a laser toward a pre-set direction. In an embodiment, the light emitter of the LiDAR sensor 120 may output a laser toward a front direction of the robot 100. The LiDAR sensor 120 may include a receiver that receives the laser reflected from an object after being output from the light emitter.

The memory 130 may store an operating system (OS) for controlling the overall operation of elements of the robot 100 and commands or instructions associated with the elements of the robot 100. In an embodiment, the memory 130 may be implemented as a non-volatile memory (e.g., hard disk, solid state drive (SSD), flash memory), a volatile memory, and the like. In an example, the memory 130 may store information on an installation position and installation orientation (or angle) of the depth camera 110 and the LiDAR sensor 120.

In another embodiment, the processor 140 may be a configuration for controlling the overall operation of the robot 100, and may include a first depth information obtaining module 141, a second depth information obtaining module 142, a depth information aligning module 143, a depth difference obtaining module 144, a correction determining module 145, a correction target area identifying module 146, a filter determining module 147, a depth information correcting module 148, and a driving route generating module 149.

The first depth information obtaining module 141 may obtain first depth information based on a sensing value of the depth camera 110 and the first depth image that includes the first depth information. The first depth information may refer to a depth value that corresponds to respective pixels in the first depth image.

In an embodiment, the second depth information obtaining module 142 may obtain second depth information based on a sensing value of the LiDAR sensor 120. In another embodiment, the second depth information obtaining module 142 may obtain the second depth information based on an emission time point of emitted light emitted from the LiDAR sensor 120 and reception time point of received light.

Because the installation positions of the depth camera 110 and the LiDAR sensor 120 are different, it may be necessary to align the first depth information and the second depth information accordingly. In an example, the depth information aligning module 143 may align the first depth information and the second depth information based on position information of the depth camera 110 and the LiDAR sensor 120 stored in the memory 130. Then, the depth information aligning module 143 may perform mapping of the first depth information and the second depth information with a same reference coordinate system. At this time, the depth information aligning module 143 may move at least one coordinate from among the first depth information and the second depth information.

In an embodiment, the depth difference obtaining module 144 may obtain a depth difference between the first depth information and the second depth information by comparing the aligned first depth information and the second depth information. In another embodiment, the depth difference obtaining module 144 may calculate the depth difference between the first depth information and the second depth information for respective positions on the reference coordinate system. The depth difference obtaining module 144 may calculate a difference between first depth information z1-1 and second depth information z1-2 for a first position (x1, y1). Then, the depth difference obtaining module 144 may calculate a difference between first depth information z2-1 and second depth information z2-2 for a second position (x2, y2).

In yet another embodiment, the depth difference obtaining module 144 may calculate an average of the depth differences for the respective positions on the reference coordinate system. In an example, if a position at which the second depth information is present is only at the first position (x1, y1) and the second position (x2, y2), the depth difference obtaining module 144 may calculate an average between the depth difference from the first position (x1, y1) and the depth difference from the second position (x2, y2).

The correction determining module 145 may determine whether to perform correction of the first depth information based on a depth difference between the first depth information and the second depth information. For example, if an average of the depth difference between the first depth information and the second depth information is greater than a threshold value, the correction determining module 145 may determine to perform correction of the first depth information. On the other hand, if the average of the depth difference between the first depth information and the second depth information is smaller than the threshold value, the correction determining module 145 may determine to not perform the correction of the first depth information.

If it is determined to perform correction of the first depth information, the correction target area identifying module 146 may identify a correction target area based on the average value of the depth difference between the first depth information and the second depth information (hereinafter, referred to as an average value in depth difference). The correction target area may refer to an area at which correction of first depth information is to be performed from the reference coordinate system. In an example, the correction target area may be set as a surrounding area of the area at which the second depth information is present. In addition, the correction target area identifying module 146 may identify the correction target area based on a pre-defined equation based on an average value in depth difference. In an example, a range of the correction target area may become broader as the average value in depth difference becomes greater. As the average value in depth difference becomes greater, the processor 140 may perform correction of the first depth information over a broad area.

In an embodiment, when it is determined to perform correction of the first depth information, the filter determining module 147 may determine information on a filter for correcting first depth information based on the average value in depth difference. Here, the information on the filter may include at least one from among a size of the filter, and a standard deviation of the filter. In another embodiment, the filter determining module 147 may determine a filter large in size as the average value in depth difference becomes greater. The size of the filter may be a first size (3×3) when the average value in depth difference is a first value, and the size of the filter may be a second size (4×4) which is greater than the first size when the average value in depth difference is a second value which is greater than the first value. In addition, the filter determining module 147 may determine a filter with a large standard deviation as the average value in depth difference becomes greater.

In yet another embodiment, the depth information correcting module 148 may perform correction of the first depth information based on the aligned first depth information and the second depth information, the correction target area, and the filter. The depth information correcting module 148 may obtain the first depth information included in the correction target area based on the filter and a weight value to be applied to the depth information of a surrounding area of the first depth information. Then, the depth information correcting module 148 may correct the first depth information by applying the obtained weight value with respect to the first depth information and the depth information on the surrounding area of the first depth information. The surrounding area of the first depth information may be determined based on the size of the filter. A more detailed description on a method of correcting the first depth information will be described below with reference to FIGS. 3, 4A, 4B, and 4C. The first depth information and the second depth information may refer to depth information aligned through the depth information aligning module 143 unless otherwise specifically mentioned below.

In an embodiment, the driving route generating module 149 may generate a driving route of the robot 100 based on the depth information obtained through the depth information correcting module 148. For example, the driving route generating module 149 may generate a driving route that detours around an object based on depth information on a surrounding object. In another example, the driving route generating module 149 may perform an operation for being in close proximity within a pre-set distance from an object based on depth information on the object. Because the level of accuracy in depth information is improved through the depth information correcting module 148, the driving route generating module 149 may generate an optimal driving route, and accordingly, driving efficiency of the robot 100 may be improved.

In the disclosure, although the robot 100 is described mainly as generating a driving route based on the depth information and driving along a generated driving route, the robot 100 may perform various operations based on the depth information. In an example, the robot 100 may move an arm for performing an interaction with a user to a body part (e.g., hand) of the user based on depth information. If the level of accuracy in depth information is increased, the robot 100 may move the arm accurately to a pre-set position (e.g., a position spaced part from a user hand by 5 cm).

Figure 3:
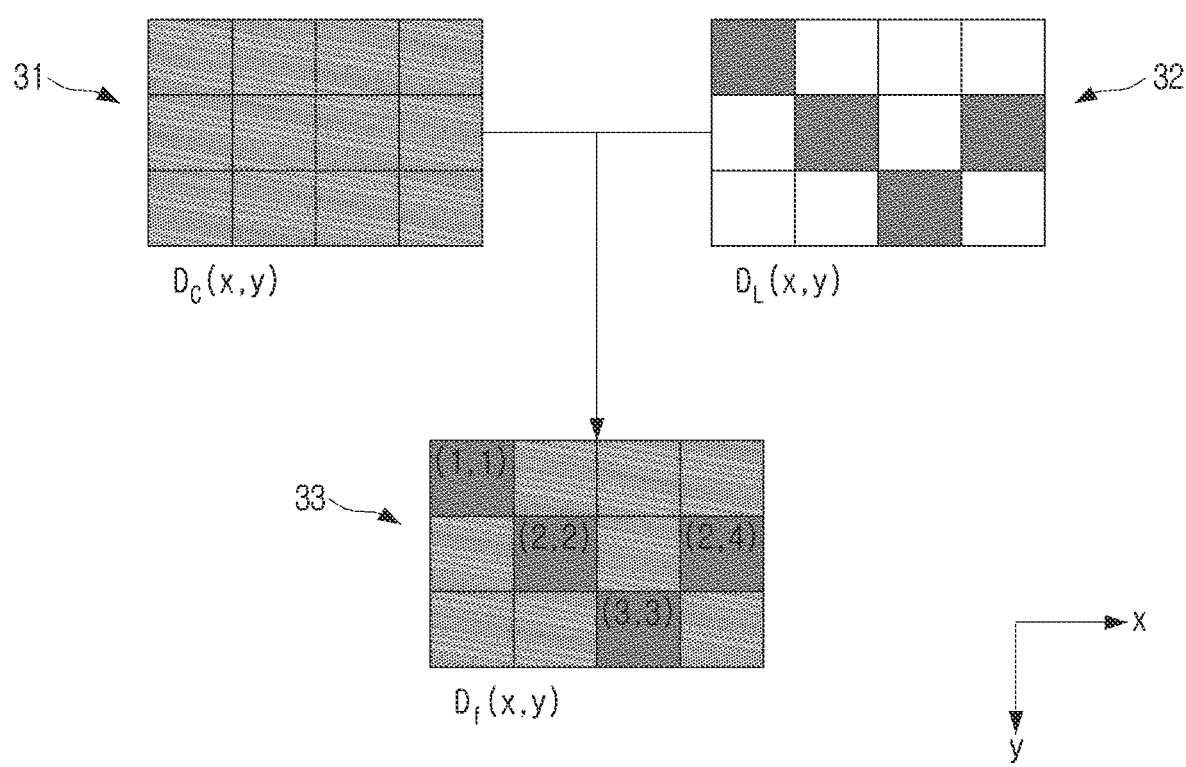
FIG. 3 is a diagram illustrating a correction method of depth information according to an embodiment of the disclosure.

FIG. 3 is a diagram illustrating a correction method of depth information according to an embodiment of the disclosure.

A robot 100 may obtain first depth information 31 (or first depth image) by using a depth camera 110, and obtain second depth information 32 by using a LiDAR sensor 120.

The robot 100 may obtain the depth difference between the first depth information 31 and the second depth information 32. For example, the robot 100 may obtain a difference between the second depth information 32 and the first depth information 31 corresponding to positions ((1,1), (2,2), (3,3), and (2,4)) at which the second depth information 32 is present. Then, the robot 100 may calculate an average in depth difference for the respective positions ((1,1), (2,2), (3,3), and (2,4)).

If the average in depth difference is greater than the threshold value, the robot 100 may obtain third depth information 33 by correcting the first depth information 31 based on the second depth information 32. The robot 100 may change or substitute the first depth information 31 for the respective positions ((1,1), (2,2), (3,3), and (2,4)) at which the second depth information 32 is present to the second depth information 32. Because the level of accuracy of the LiDAR sensor 120 is greater than the level of accuracy of the depth camera 110, the robot 100 may substitute the first depth information 31 with the second depth information 32 with respect to the area at which the second depth information 32 is present from among the first depth information 31. The third depth information 33 may be depth information of which the first depth information 31 and the second depth information 32 are fused, and may be represented with Equation 1 below.

$$D_f(x, y) = \begin{cases} D_L(x, y) & \text{where } \{x, y\} \in P_L \\ D_C(x, y) \end{cases} \quad \text{Equation 1}$$

Here, $D_C(x,y)$ represents the first depth information 31, $D_L(x,y)$ represents the second depth information 32, and $D_f(x,y)$ represents depth information in which the first depth information 31 and the second depth information 32 are fused. $P_L$ represents a set of (x,y) coordinates in which a sensing value of the LiDAR sensor 120 is present.

Referring to FIG. 3, an operation of obtaining, by the robot 100, depth information in which the first depth information 31 and the second depth information 32 are fused by performing a depth correction of an area at which the second depth information 32 is present has been described. In an embodiment, the robot 100 may perform depth correction on not only the area at which the second depth information 32 is present but also on a surrounding area at which the second depth information 32 is present.

Figure 4A:
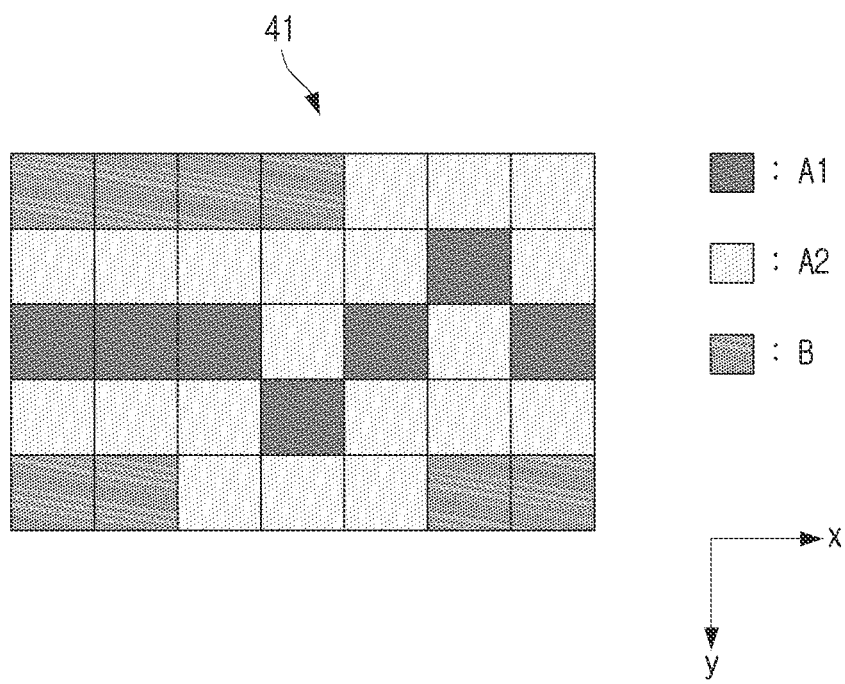
FIG. 4A is a diagram illustrating a correction method of depth information according to an embodiment of the disclosure.

FIG. 4A is a diagram illustrating a depth correction method according to an embodiment of the disclosure.

Depth information 41 in which a first depth information and a second depth information are fused may include a first area A1, a second area A2, and a third area B. The first area A1 and the second area A2 may refer to correction target areas at which correction is to be performed. Specifically, the first area A1 may refer to an area corresponding to the second depth information that is obtained through the LiDAR sensor 120. In addition, the third area B may refer to an area at which correction is not performed.

In an embodiment, the robot 100 may determine the second area A2 based on position information of the first area A1 and the depth difference between the first depth information and the second depth information. The second area A2 may be formed based on the first area A1, and may be formed such that a range becomes broader as the depth difference becomes greater. In another embodiment, the robot 100 may perform correction of the first depth information over a broad range as the depth difference becomes greater. That is, the robot 100 may perform correction of the first depth information over a broad range by determining that an error in the first depth information is great as the depth difference becomes greater.

The depth information for respective areas are as described below. First, as described above, the first depth information included in the first area A1 may be substituted with the second depth information. The depth information of the first area A1 may be second depth information ($D_L(x,y)$).

In addition, because the third area B is the area at which correction is not performed, information on the third area B may be first depth information ($D_C(x,y)$).

In an embodiment, the robot 100 may perform correction of the first depth information included in the second area A2 by applying a filter with respect to depth information included in the second area A2.

Figure 4B:
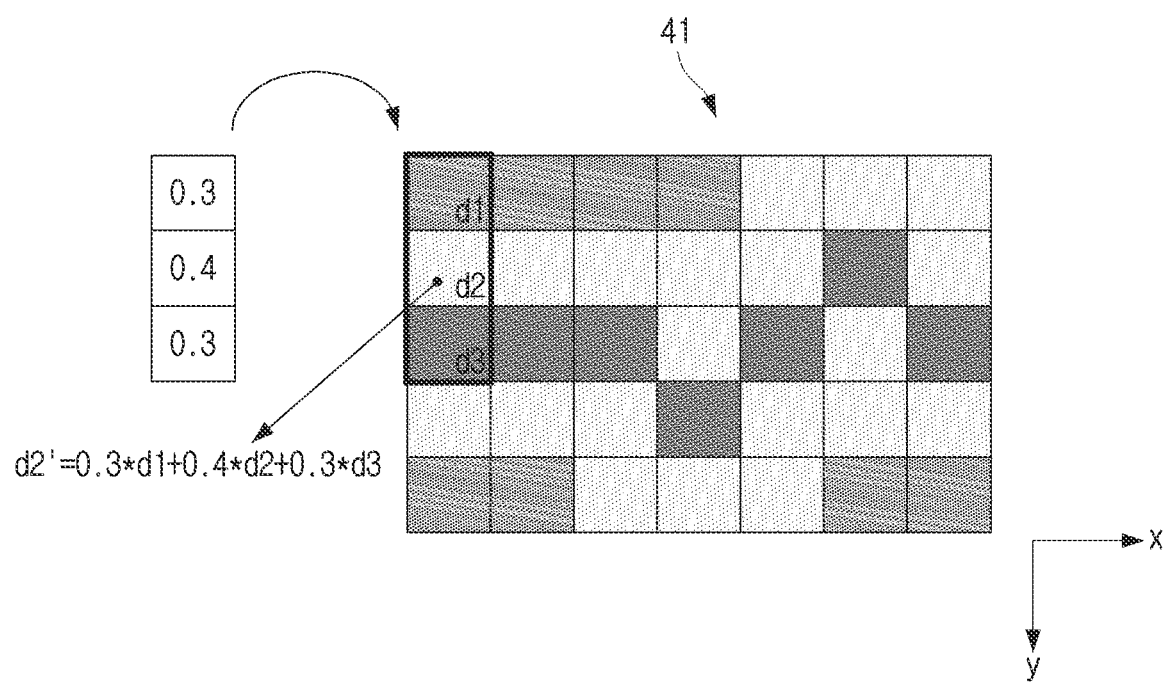
FIG. 4B is a diagram illustrating a correction method of depth information according to an embodiment of the disclosure.

FIG. 4B is a diagram illustrating a method of correcting the first depth information included in the second area A2 according to an embodiment of the disclosure.

In an example, a robot 100 may perform correction of first depth information d2 included in the second area A2. At this time, the robot 100 may perform correction of the first depth information d2 by applying a filter 42 which includes weight values based on the first depth information d2. Specifically, a corrected first depth information d2' may be a sum of first depth information d1 and d2 and second depth information d3 which are respectively applied with weight values (0.3, 0.4, and 0.3). The robot 100 may perform correction of the first depth information included in the second area A2 by using the filter 42, and the correction completed first depth information may be represented as Equation 2 below.

$$D(x, y) = \begin{cases} \sum_{x', y' \in (P_L(x,y) \cup P_C(x,y))} a_{x,y} G_{x,y}(x', y') D_f(x', y') & \text{Equation 2} \\ \text{where } \{x, y\} \in P_{LNeighbor} \\ D_f(x, y) \end{cases}$$

Here, $D_f(x,y)$ may represent fused depth information in Equation 1, $P_L$ may represent a set of (x,y) coordinates at which the sensing value of the LiDAR sensor 120 is present, $P_C$ may represent a set of (x,y) coordinates at which the first depth information is present. In addition, $P_{LNeighbor}$ may represent a set of (x,y) coordinates included in the second area A2. $\alpha_{x,y} G_{x,y}(x',y')$ may represent weight values that are applied to the depth information, $G_{x,y}(x,y)$ may represent a kernel function that corresponds to the filter, and $\alpha_{x,y}$ may represent a multiplier.

In another embodiment, the robot 100 may perform correction of the first depth information included in the second area A2 by applying weight values of the filter to only depth information (i.e., second depth information) on an area at which the sensing value of the LiDAR sensor 120 is present as with Equation 3 below. Referring to FIG. 4B as an example, the robot 100 may apply weight values with respect to the second depth information d3 only when performing correction of the first depth information d2.

$$D(x, y) = \quad \text{Equation 3}$$

$$\begin{cases} \sum_{x', y' \in (P_L(x,y))} a_{x,y} G_{x,y}(x', y') D_f(x', y') & \text{where } \{x, y\} \in P_{LNeighbor} \\ D_f(x, y) \end{cases}$$

Here, weight values with respect to the depth information may be determined so as to satisfy Equation 4 below.

$$\sum_{x', y' \in P_L(x,y)} \alpha_{x,y} G_{x,y}(x', y') = 1 \quad \text{Equation 4}$$

Referring to FIG. 4B, an example of the filter 42 being 1-dimensional has been provided, but the filter may be 2-dimensional.

Figure 4C:
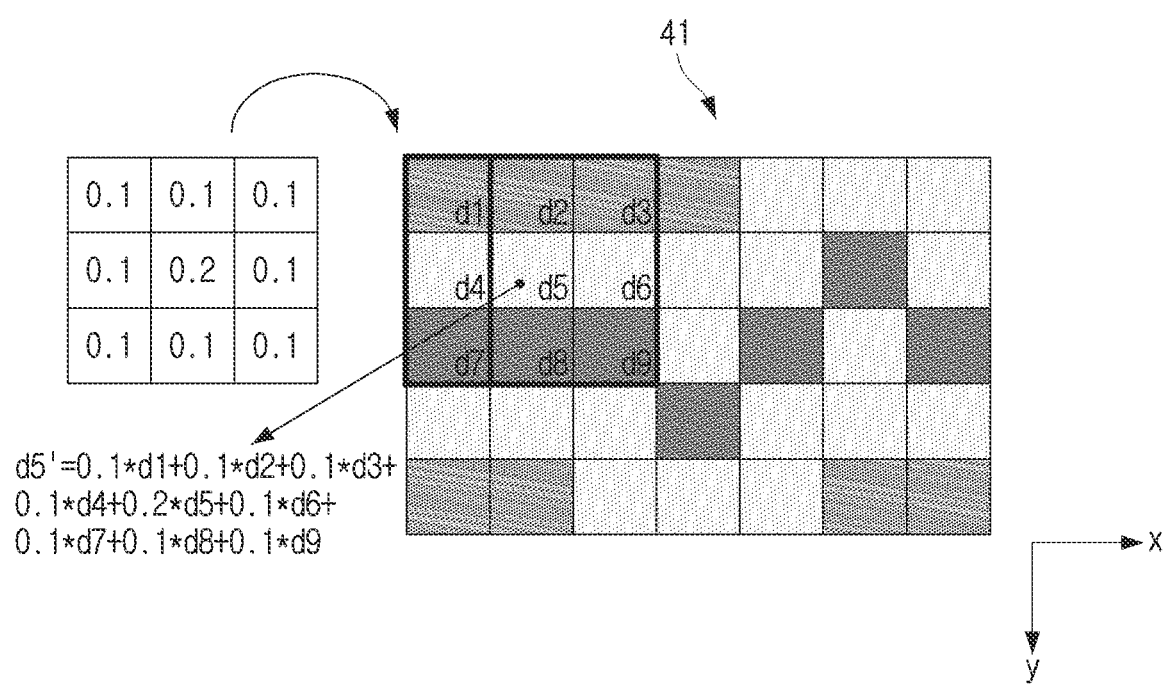
FIG. 4C is a diagram illustrating a correction method of depth information according to an embodiment of the disclosure.

FIG. 4C is a diagram illustrating a method of correcting the first depth information included in the second area A2 according to an embodiment of the disclosure.

In an example, a robot 100 may perform correction of first depth information d5 included in the second area A2 based on Equation 2. At this time, the robot 100 may perform correction of first depth information d5 by applying the filter 42 which includes the weight values based on the first depth information d5. A corrected first depth information d5' may be a sum of first depth information d1 to d6 and second depth information d7 to d9 which are respectively applied with weight values (0.1, 0.1, 0.1, 0.1, 0.2, 0.1, 0.1, 0.1, and 0.1).

In an embodiment, the robot 100 has been described as determining one filter based on the average in depth difference between the first depth information and the second depth information, and performing correction of the first depth information based on the determined filter. In another embodiment, the robot 100 may perform correction using a same filter when performing correction of the first depth information included in the first depth image in one frame.

However, there is a tendency for an error in first depth information to increase as a distance from the robot 100 becomes increases. As the distance from the robot 100 increases, the difference between the first depth information and the second depth information may become greater. The robot 100 may improve the level of accuracy in the corrected depth information by applying a separate filter for a plurality of depth sections, respectively, that is defined according to the distance from the robot 100. The level of accuracy in depth information obtained by applying a separate filter for respective depth sections may be higher than the depth information obtained by applying the same filter for the whole of the first depth information.

Figure 5:
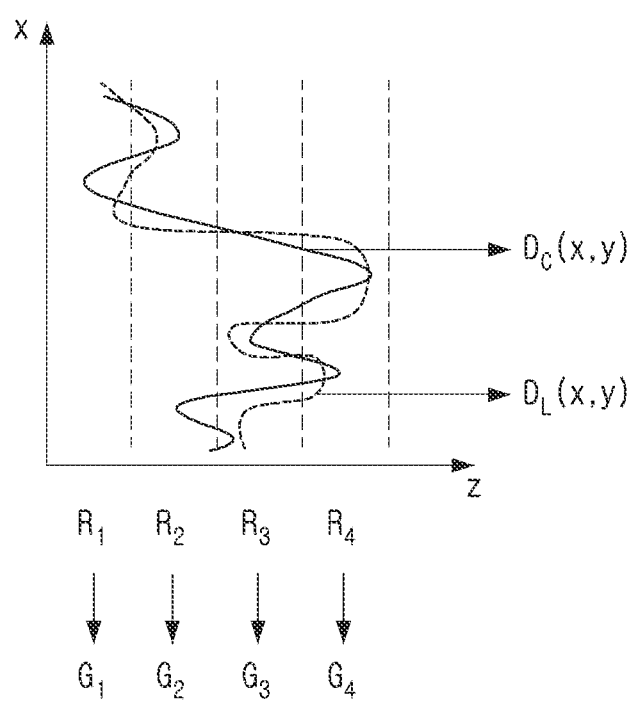
FIG. 5 is a graph illustrating depth information at a x-z plane according to an embodiment of the disclosure.

FIG. 5 is a graph illustrating depth information at a x-z plane according to an embodiment of the disclosure.

A robot 100 may obtain a plurality of filters ($G_1$, $G_2$, $G_3$, and $G_4$) corresponding to a plurality of depths sections ($R_1$, $R_2$, $R_3$, and $R_4$), respectively. For example, the robot 100 may obtain an average value in depth difference between first depth information ($D_C(x,y)$) and second depth information ($D_L(x,y)$) from a first section ($R_1$), and obtain a first filter ($G_1$) based on the obtained average value. In addition, the robot 100 may obtain the average value in depth difference between the first depth information ($D_C(x,y)$) and the second depth information ($D_L(x,y)$) from a second section ($R_2$), and obtain a second filter ($G_2$) based on the obtained average value. Likewise, the robot 100 may obtain a third filter ($G_3$) and a fourth filter ($G_4$) corresponding to a third section ($R_3$) and a fourth section ($R_4$), respectively. At this time, a size of the respective filters or the standard deviation may be varied according to the average value in depth difference for the respective depth sections.

In an embodiment, the robot 100 may perform correction of the first depth information by applying a separate filter for the respective depth sections within the depth image of one frame. Accordingly, the robot 100 may obtain depth information with an improved level of accuracy.

Figure 6:
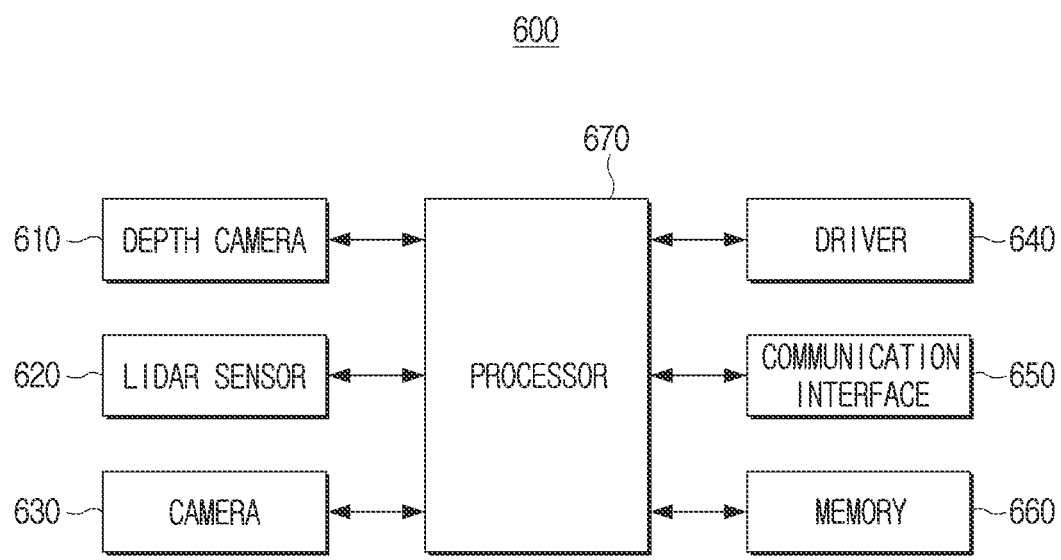
FIG. 6 is a block diagram illustrating a configuration of a robot according to an embodiment of the disclosure.

FIG. 6 is a block diagram illustrating a configuration of a robot according to an embodiment of the disclosure.

A robot 600 may include a depth camera 610, a LiDAR sensor 620, a camera 630, a driver 640, a communication interface 650, a memory 660, and a processor 670.

In an embodiment, the depth camera 610 and the LiDAR sensor 620 may correspond to the depth camera 110 and the LiDAR sensor 120 in FIG. 2. Accordingly, the processor 670 may obtain depth information by using the depth camera 610 and the LiDAR sensor 620.

In another embodiment, the camera 630 may be a configuration for obtaining an image of a surrounding of the robot 600. The processor 670 may identify an object included in the image obtained through the camera 630. To this end, the processor 670 may include an object recognition module.

In yet another embodiment, the driver 640 may be a configuration for moving the robot 600. Specifically, the driver 640 may include an actuator for a driving of the robot 600. In addition, an actuator for driving motions of other physical configurations (e.g., arm, etc.) of the robot 600 may be included in addition to the driver 640. In an example, the robot 600 may control the actuator to move or motion toward the identified object. Alternatively, the robot 600 may control the actuator to move detouring around the identified object.

In still another embodiment, the communication interface 650 may include at least one circuitry, and perform communication with external devices of various types. For example, the communication interface 650 may perform communication with an external server or a user terminal. In addition, the communication interface 650 may perform communication with an external device according to communication methods of various types. The communication interface 650 may perform data communication via wired or wireless means. If communication with an external device is performed through a wireless communication means, the communication interface 650 may include at least one from among a wireless fidelity (Wi-Fi) communication module, a cellular communication module, a 3rd generation (3G) mobile communication module, a 4th generation (4G) mobile communication module, a 4th generation long term evolution (LTE) communication module, and a 5th generation (5G) mobile communication module. According to an embodiment of the disclosure, the communication interface 650 may be implemented as a wireless communication module, but this is merely one embodiment, and may be implemented as a wired communication module (e.g., LAN, etc.).

The memory 660 may be configured to store at least one instruction for controlling operations of elements of the robot 600. The memory 660 may correspond to the memory 130 in FIG. 2.

In an embodiment, the processor 670 may be a configuration for controlling an overall operation of the robot 600. For example, the processor 670 may obtain a first depth image which includes first depth information by using the depth camera 610, and obtain second depth information that corresponds to a first area of the first depth image by using the LiDAR sensor 620. In another example, the first area of the first depth image may be the first area A1 in FIG. 4A.

In another embodiment, the processor 670 may obtain a depth difference between the second depth information and the first depth information included in the first area. The processor 670 may calculate an average in depth difference between the first depth information and the second depth information.

If the depth difference is greater than a threshold value, the processor 670 may perform correction of the first depth information using the second depth information. The processor 670 may identify a correction target area at the surrounding area of the first area. At this time, the correction target area may be determined based on the average in depth difference between the first depth information and the second depth information. In an example, if the depth difference is the first value, the processor 670 may identify a first range from the first area as the correction target area. If the depth difference is a second value that is greater than the first value, the processor 670 may identify a second range that is greater than the first range from the first area as the correction target area.

In addition, the processor 670 may obtain information on a filter for correcting the first depth information based on the depth difference. At this time, the processor 670 may obtain a parameter (e.g., size) of the filter based on the depth difference. If the depth difference is smaller than a pre-set value, the processor 670 may obtain a filter of a first size. If the depth difference is greater than the pre-set value, the processor 670 may obtain a filter of a second size that is greater than the first size.

The processor 670 may be configured to obtain information on the filter based on a distance from the robot 600. In an example, the processor 670 may obtain the depth difference between the first depth information and the second depth information for a plurality of distance sections, respectively, that is determined according to the distance from the robot 600. Then, the processor 670 may obtain information on the filter for the respective distance sections based on the depth difference for the respective distance sections.

If the correction target area is identified and information on the filter is obtained, the processor 670 may perform correction of the first depth information corresponding to the correction target area based on the first depth information, the second depth information, and the information on the filter. In an embodiment, the processor 670 may perform correction of the first depth information by applying a filter to the first depth information included in the correction target area. In another embodiment, the processor 670 may obtain a second depth image which includes the corrected first depth information.

Figure 7:
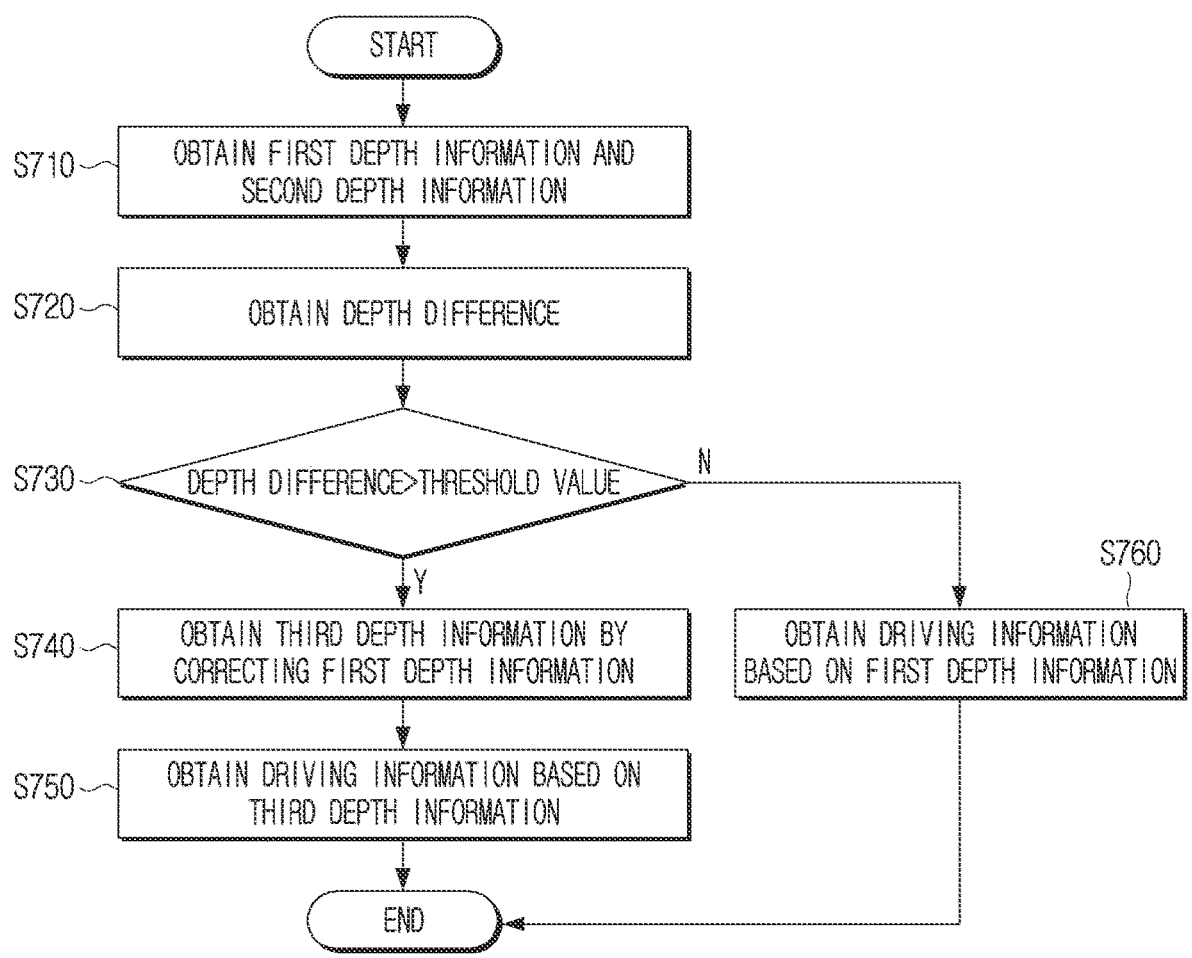
FIG. 7 is a block diagram illustrating a control method of a robot according to an embodiment of the disclosure.

FIG. 7 is a block diagram illustrating a control method of a robot according to an embodiment of the disclosure.

A robot 600 may obtain the first depth information and the second depth information at operation S710, and obtain the depth difference between the first depth information and the second depth information at operation S720. Then, the robot 600 may determine whether the obtained depth difference is greater than the threshold value at operation S730.

If the depth difference is greater than the threshold value, the robot 600 may obtain the third depth information by correcting the first depth information at operation S740. At this time, the robot 600 may obtain the third depth information by applying the filter obtained based on the depth difference to the first depth information. Then, the robot 600 may obtain driving information of the robot 600 based on the third depth information at operation S750. If the depth difference is smaller than the threshold value, the robot 600 may not perform correction of the first depth information, and may obtain the driving information based on the first depth information at operation S760. For example, the robot 600 may generate a driving route of the robot 600 based on the first depth information or the third depth information.

FIG. 8 is a block diagram illustrating a control method of a robot according to an embodiment of the disclosure.

A robot 600 may obtain the first depth image which includes the first depth information by using the depth camera included in the robot, and obtain the second depth information that corresponds to the first area of the first depth image by using the LiDAR sensor included in the robot at operation S810. Then, the robot 600 may obtain the depth difference between the second depth information and the first depth information included in the first area at operation S820. If the depth difference is greater than the threshold value, the robot 600 may identify the correction target area in the surrounding area of the first area at operation S830. Then, the robot 600 may obtain information on the filter for correcting the first depth information based on the depth difference at operation S840. The robot 600 may obtain the second depth image by correcting the first depth information corresponding to the correction target area based on the first depth information, the second depth information, and the information on the filter at operation S850. At this time, the robot 600 may apply weight values identified based on the filter to the first depth information and the second depth information. Then, the robot 600 may generate the driving route of the robot based on the second depth image at operation S860.

The various embodiments described above may be implemented in a recordable medium which is readable by a computer or a device similar to the computer using software, hardware, or the combination of software and hardware. In some cases, embodiments described herein may be implemented by the processor itself. According to a software implementation, embodiments such as the procedures and functions described herein may be implemented with separate software modules. The respective software modules may perform one or more functions and operations described herein.

The computer instructions for performing processing operations according to the various embodiments described above may be stored in a non-transitory computer-readable medium. The computer instructions stored in this non-transitory computer-readable medium may cause a specific device to perform the processing operations according to the above-described various embodiments when executed by the processor.

The non-transitory computer readable medium may refer to a medium that stores data semi-permanently rather than storing data for a very short time, such as a register, a cache, a memory, or the like, and is readable by a device. Specific examples of the non-transitory computer readable medium may include, for example, and without limitation, a compact disc (CD), a digital versatile disc (DVD), a hard disc, a Blu-ray disc, a universal serial bus (USB), a memory card, a read-only memory (ROM), and the like.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. A robot, comprising:
a depth camera;
a light detection and ranging (LiDAR) sensor;
a memory configured to store at least one instruction; and
at least one processor,
wherein the processor is configured to:
obtain a first depth image that comprises first depth information by using the depth camera, and obtain second depth information corresponding to a first area of the first depth image by using the LiDAR sensor,
obtain a depth difference between the second depth information and the first depth information comprised in the first area,
identify, based on the depth difference being greater than a threshold value, a correction target area in a surrounding area of the first area,
obtain information on a filter for correcting the first depth information based on the depth difference, and obtain a second depth image by correcting the first depth information that corresponds to the correction target area based on the first depth information, the second depth information, and the information on the filter.

2. The robot of claim 1, wherein the at least one processor is further configured to:
identify, based on the depth difference being a first value, a first range from the first area as the correction target area, and
identify, based on the depth difference being a second value that is greater than the first value, a second range that is greater than the first range from the first area as the correction target area.

3. The robot of claim 1,
wherein the filter is a matrix that comprises a plurality of weight values, and
wherein the information on the filter comprises at least one from among a size of the filter and a standard deviation of the filter.

4. The robot of claim 1, wherein the at least one processor is further configured to:
obtain, based on the depth difference being smaller than a pre-set value, the filter of a first size, and
obtain, based on the depth difference being greater than the pre-set value, the filter of a second size that is greater than the first size.

5. The robot of claim 1, wherein the at least one processor is further configured to:
perform correction of the first depth information that corresponds to the correction target area by applying weight values comprised in the filter to the second depth information and the first depth information corresponding to a surrounding area of the correction target area.

6. The robot of claim 1, wherein the at least one processor is further configured to:
perform mapping of the first depth information and the second depth information as a reference coordinate system based on an installation position of the depth camera and the LiDAR sensor, and
obtain an average value of a difference between the second depth information and the first depth information corresponding to the first area on the reference coordinate system as the depth difference.

7. The robot of claim 1, wherein the at least one processor is further configured to:
obtain a difference between the first depth information and the second depth information corresponding respectively to a plurality of distance sections determined according to a distance from the robot,
obtain, based on the depth difference for the respective distance sections, the information on the filter that corresponds to the respective distance sections, and
perform correction of the first depth information corresponding to the correction target area based on information on the filter for the respective distance sections.

8. The robot of claim 1, wherein the filter corresponds to a Gaussian kernel function.

9. A control method of a robot, the method comprising:
obtaining a first depth image that comprises first depth information by using a depth camera comprised in the robot, and obtaining second depth information corresponding to a first area of the first depth image by using a LiDAR sensor comprised in the robot;
obtaining a depth difference between the second depth information and the first depth information comprised in the first area;
identifying, based on the depth difference being greater than a threshold value, a correction target area in a surrounding area of the first area;
obtaining information on a filter for correcting the first depth information based on the depth difference;
obtaining a second depth image by correcting the first depth information that corresponds to the correction target area based on the first depth information, the second depth information, and the information on the filter; and
generating a driving route of the robot based on the second depth image.

10. The method of claim 9, wherein the identifying of the correction target area comprises:
identifying, based on the depth difference being a first value, a first range from the first area as the correction target area; and
identifying, based on the depth difference being a second value that is greater than the first value, a second range that is greater than the first range from the first area as the correction target area.

11. The method of claim 9,
wherein the filter is a matrix that comprises a plurality of weight values, and
wherein the information on the filter comprises at least one from among a size of the filter and a standard deviation of the filter.

12. The method of claim 9, wherein the obtaining of the information on the filter comprises:
obtaining, based on the depth difference being smaller than a pre-set value, the filter of a first size; and
obtaining, based on the depth difference being greater than the pre-set value, the filter of a second size that is greater than the first size.

13. The method of claim 9, wherein the obtaining of the second depth image comprises:
performing correction of the first depth information that corresponds to the correction target area by applying weight values comprised in the filter to the second depth information and the first depth information corresponding to a surrounding area of the correction target area.

14. The method of claim 9, wherein the obtaining of the depth difference comprises:
performing mapping of the first depth information and the second depth information as a reference coordinate system based on an installation position of the depth camera and the LiDAR sensor; and
obtaining an average value of a difference between the second depth information and the first depth information corresponding to the first area on the reference coordinate system as the depth difference.

15. The method of claim 9,
wherein the obtaining of the depth difference comprises:
obtaining a difference between the first depth information and the second depth information corresponding respectively to a plurality of distance sections determined according to a distance from the robot,
wherein the obtaining of the information on the filter comprises:
obtaining, based on the depth difference for the respective distance sections, the information on the filter that corresponds to the respective distance sections, and wherein the obtaining the second depth image comprises:
performing correction of the first depth information corresponding to the correction target area based on information on the filter for the respective distance sections.

16. A non-transitory computer readable recording medium storing computer instructions that cause a robot to perform an operation when executed by a processor of an electronic apparatus, wherein the operation comprises;
- obtaining a first depth image that comprises first depth information by using a depth camera comprised in the robot, and obtaining second depth information corresponding to a first area of the first depth image by using a LiDAR sensor comprised in the robot;
- obtaining a depth difference between the second depth information and the first depth information comprised in the first area;
- identifying, based on the depth difference being greater than a threshold value, a correction target area in a surrounding area of the first area;
- obtaining information on a filter for correcting the first depth information based on the depth difference;
- obtaining a second depth image by correcting the first depth information that corresponds to the correction target area based on the first depth information, the second depth information, and the information on the filter; and
- generating a driving route of the robot based on the second depth image.

* * * * *